United States Patent [19]

Rowland et al.

[11] Patent Number: 5,606,636
[45] Date of Patent: Feb. 25, 1997

[54] OPTICAL CABLE FOR AVOIDING DRY-BAND ARCING

[75] Inventors: Simon M. Rowland, Tarporley; Colin A. Platt, Neston; John Richards, Liverpool, all of England

[73] Assignee: BICC Public Limited Company, London, England

[21] Appl. No.: 537,795

[22] PCT Filed: Apr. 22, 1994

[86] PCT No.: PCT/GB94/00860

§ 371 Date: Oct. 23, 1995

§ 102(e) Date: Oct. 23, 1995

[87] PCT Pub. No.: WO94/24596

PCT Pub. Date: Oct. 27, 1994

[30] Foreign Application Priority Data

Apr. 22, 1993 [GB] United Kingdom ............ 9308361

[51] Int. Cl.⁶ ............................................. G02B 6/44
[52] U.S. Cl. ................. 385/101; 385/100; 174/70 A
[58] Field of Search ............................. 385/100–114; 174/70 R, 70 A

[56] References Cited

U.S. PATENT DOCUMENTS

| 4,479,702 | 10/1984 | Pryor et al. | 385/101 |
| 4,673,247 | 6/1987 | Oestreick | 385/101 |
| 4,756,596 | 7/1988 | Ona et al. | 385/101 |
| 4,776,665 | 10/1988 | Oestreich | 385/101 X |
| 4,993,805 | 2/1991 | Abe et al. | 385/101 X |
| 5,018,825 | 5/1991 | Rowland | 385/101 |
| 5,513,292 | 4/1996 | Rowland et al. | 385/100 |
| 5,526,457 | 6/1996 | Rowland et al. | 385/101 |

FOREIGN PATENT DOCUMENTS

| 0258028 | 8/1987 | European Pat. Off. . |
| 60-122910 | 7/1985 | Japan . |
| WO91/16648 | 10/1991 | WIPO . |
| WO93/23779 | 11/1993 | WIPO . |

OTHER PUBLICATIONS

Arc Control Devices For Self Supporting Optical cables, C. N. Carter, IEE vol. 140, No. 5, Sep. 1993, pp. 357–361.
Development of Aerial Fibre Optic Cables For Operation on 400KV Power Lines, A. J. Peacock, IEE vol. 139, No. 6, 1992 Stevanage GB, pp. 3304–3314 XP323699.

Primary Examiner—John D. Lee
Assistant Examiner—Phan T. H. Palmer
Attorney, Agent, or Firm—Gary M. Nath; Nath & Associates

[57] ABSTRACT

An optical cable for use in an overhead optical transmission system in which the cable is supported along the route of the system by means of towers, masts or other upstanding supports that are also employed to support electrical power cables, includes one or more optical fibers and an electrically insulating jacket (8). The cable includes an array of elongate conductive elements (10, 12) each of which extends along a portion of the cable, adjacent conductive elements axially overlapping each other with overlapping portions circumferentially spaced apart to form a composite conductive path that extends along the cable and is interrupted when the cable is dry. Adjacent conductive elements (10, 12) are resistively coupled to each other when the surface of the cable is wet to form a continuous electrically conductive path along the cable. Such a form of cable has the advantage that the dry-band arcing under wet conditions is reduced by disrupting the geometry that allows such bands to form.

20 Claims, 2 Drawing Sheets

OPTICAL CABLE FOR AVOIDING DRY-BAND ARCING

BACKGROUND OF THE INVENTION

This invention relates to optical cables for use in optical transmission systems, and especially to cables for use in overhead optical transmission systems in which the cable is supported along the route of the system by means of towers, masts or other upstanding supports that are also employed to support electrical power cables.

In systems of this kind it is the general practice to earth the optical cable or cables at the towers, masts or other supports (hereinafter simply referred to as towers). When the electrical power lines are on load, electrical currents may be capacitively induced on the optical cable due to the distributed capacitance between the cable and the power lines. The voltage induced on the optical cable will reach a maximum at mid span between the towers, while the current flowing along the cable will be greatest in the region of the towers. Under dry conditions the induced currents will be relatively small due to the relatively high longitudinal resistance of the cable, e.g. in the region of $10^{12}$ Ohm $m^{-1}$ but under wet conditions when the surface resistance of the cable is much lower, e.g. in the region of 10M Ohm $m^{-1}$, much higher currents will be induced. Joule heating of the cable surface by the induced currents can cause a short length of the cable surface to become dry, usually in the region of a tower where the current is highest. When this happens the major part of the induced voltage on the cable is dropped across the short dry band due to its high longitudinal resistance, and so called "dry-band arcing" may occur which can cause severe damage to the cable.

It is possible to overcome the problem of dry-band arcing by providing the optical cable with a longitudinally extruding electrically conductive element. However, it is possible in some circumstances for the optical cable to touch one of the power conductors or to become sufficiently close to the power conductor to allow flash over to occur, referred to herein as "clashing". This may occur after the cable has been installed, especially under windy conditions or if the cable is carrying considerable ice which will make it stretch, with the result that the conductive element will be burned away or evaporate. Clashing of the optical cable with a power line may also occur during installation of an optical fibre cable on to an electrical transmission system that is on load, with the consequent risk to the safety of the installation personnel if the optical cable is conductive. One solution to the latter problem is to install a conventional All Dielectric Self Supporting (ADSS) optical cable and then wrap a conductor around the installed cable in situ. Such a procedure, however, has the disadvantage that it requires two separate installation operations with consequent increase in expense, and does not overcome the problem of clashing of the installed cable. Another solution to the problem of dry-band arcing is described in International Patent Application No: WO 91/16648 of NKF in which dry-band arcing is prevented by providing the cable with a series of capacitively coupled elements along its length. However, in order for the elements to have the appropriate degree of coupling, they are formed as overlapping annular bands along the cable, which are relatively difficult to form by conventional cable forming processes.

SUMMARY OF THE INVENTION

According to the present invention, there is provided an optical cable which comprises one or more optical fibres and an electrically insulating jacket, wherein the cable includes an array of elongate conductive elements each of which extends along a portion of the cable, adjacent conductive elements axially overlapping each other with overlapping portions thereof circumferentially spaced apart to form a composite conductive path that extends along the cable and is interrupted when the cable is dry, adjacent conductive elements being resistively coupled to each other when the surface of the cable is wet to form a continuous electrically conductive path along the cable.

The cable according to the present invention has the advantage that it is possible to form the elements as relatively long elongate elements that do not need to be configured to achieve a high degree of capacitive coupling, if any, and so can be in a form more suited to cable manufacturing techniques, but will together form a conductive path for grounding induced currents when the cable is wet. According to the invention it is possible to reduce the possibility of dry-band arcing under wet conditions by disrupting the geometry that allows such dry bands to form. Since adjacent elements have overlapping portions that extend axially along the cable or have an axial component, any dry band that forms between a pair of conductive elements will need to have a relatively long and convoluted path before it can extend continuously around the cable. Unless it does extend continuously around the cable so that its ends join up, it cannot isolate different sections of the cable, and dry-band arcing cannot occur.

Preferably, the elements have overlapping portions that extend at least 50 mm, more preferably at least 75 mm and especially at least 100 mm along the cable. Longer overlapping portions may be employed with the result that the length of the dry band will need to be even longer before arcing can occur. Advantageously the elongate elements extend helically around the cable, in which case it is preferred that the overlapping portion between adjacent conductive elements extends at least one complete revolution around the cable. Such a configuration has the advantage that any dry band must have a very convoluted shape before arcing may occur, and also that all the overlap regions will be equivalent to one another even when, as is usually the case, drying of the cable occurs preferentially in certain aspects, for example due to prevailing wind. More advantageously the overlapping portion extends at least two complete revolutions around the cable. This has the advantage that compression of any dry band that may be formed by movement of water along the cable will be prevented. Such compression is significantly more aggressive than stable dry-band arcing as it has previously been understood.

The electrically conductive elements may be formed in any of a number of ways. For example conductive tracks may be deposited on the surface of the cable by conventional techniques or they may be formed in or under the jacket. In one form of cable a plurality of parallel tracks may be formed on the surface of the cable, each track being interrupted at various points that are offset from the points at which the or each other track is interrupted so as to form alternating conductive elements with large overlapping portions. Alternatively the elements may form part of a woven material. If the elements are intended to extend helically around the cable they may form some of the warp or weft elements of the material, and the material may either be wrapped around the cable or may be cut on the bias so that it contains an array of diagonal conductive elements that are offset from one another.

If the conductive elements are located on the surface of the cable jacket, they will be directly resistively connected to one another, while if they are embedded within the jacket or located under the jacket they will be capacitively and resistively coupled to the surface water layer when the cable is wet. Although there will be some degree of capacitive coupling directly between adjacent conductive elements, such capacitive coupling does not form part of the invention, and it is intended that the impedance between adjacent conductive elements due to direct capacitive coupling be at least an order of magnitude greater than the impedance between the conductive elements due to the resistance of the surface water connection and any capacitive/resistive connection between the conductive elements and the surface water layer.

Although the conductive elements will normally be provided on the cable before installation thereof, they may be provided after installation, for example on a conventional ADSS cable.

According to the invention there is also provided an overhead optical transmission system in which a cable according to the invention is supported between towers that also support electrical power cables.

BRIEF DESCRIPTION OF THE DRAWINGS

Two forms of optical cable according to the invention will now be described by way of example, with reference to the accompanying drawings, in which.

DESCRIPTION OF THE PREFERRED EMBODIMENT(S)

Figure 1:
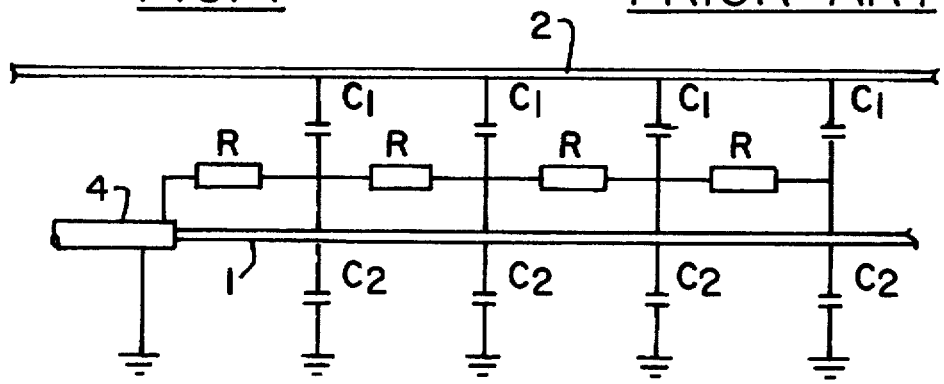
FIG. 1 is a schematic diagram of an optical cable and electric power line indicating the distributed capacitances.

Referring to the accompanying drawings, FIG. 1 illustrates a conventional "all dielectric self-supporting" (ADSS) optical cable 1 that is supported between a pair of towers that are also employed to support an electric power cable 2. The ADSS cable 1 is supported at the tower by means of a metallic clamp or fitting 4 which is earthed by means of the tower. In this system there is a distributed capacitance between the optical cable 1 and the power cable 2, indicated by lumped capacitances $C_1$, and a distributed capacitance between the optical cable 1 and ground, indicated by lumped capacitances $C_2$. In addition the cable has a large but finite longitudinal resistance indicated by lumped resistances R.

Figure 2:
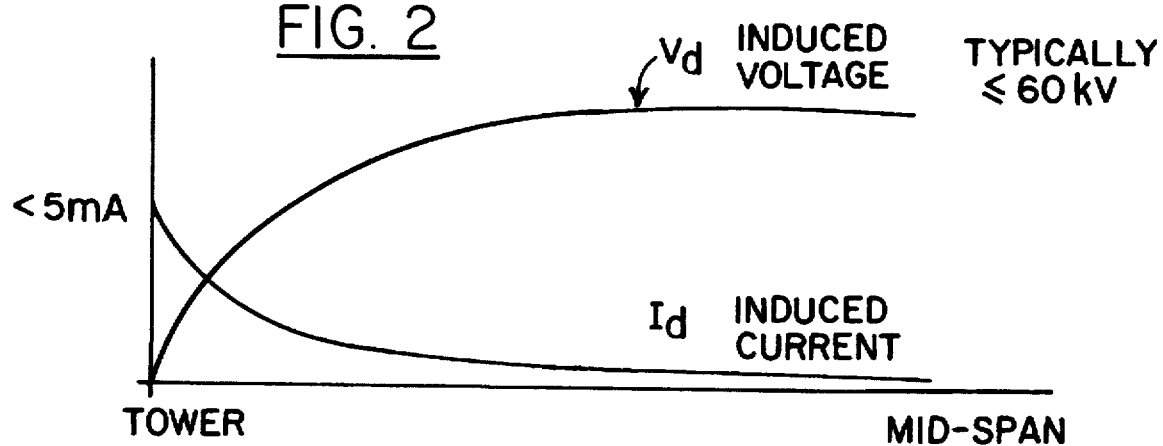
FIG. 2 is a graphical representation of the induced voltage and current on the optical cable in dry conditions.
Figure 3:
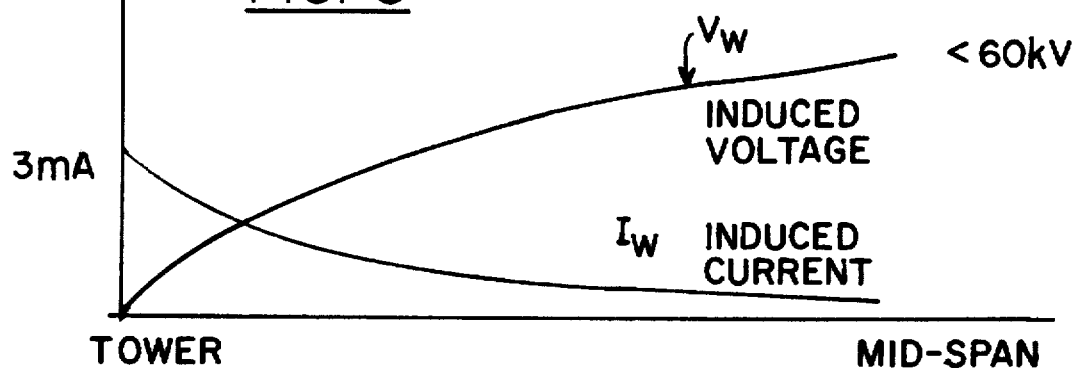
FIG. 3 is a graphical representation of the induced voltage and current on the optical cable in wet conditions.

Under dry conditions induced voltages and currents occur on the cable as shown in FIG. 2. The induced voltage is highest at mid-span, typically reaching a value of up to 60 kV on a 400 kV line, and is clearly at earth potential at the tower, while the current will be at a maximum at the tower, for example having a value of up to 5 microamps. Under wet conditions the longitudinal resistance of the optical cable is considerably lower, with the result that the maximum voltage on the optical cable is lower but the induced current has risen considerably to a typical value of 1 to 10 mA, as shown in FIG. 3.

Figure 4:
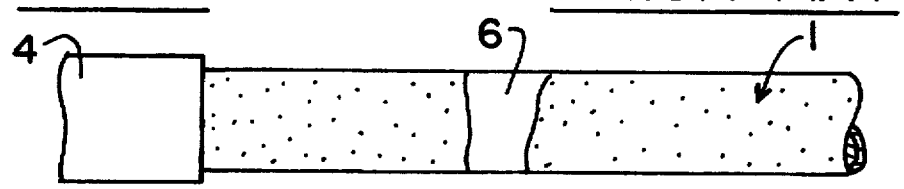
FIG. 4 is a schematic view of a conventional optical cable on which a dry band has formed.
Figure 4:
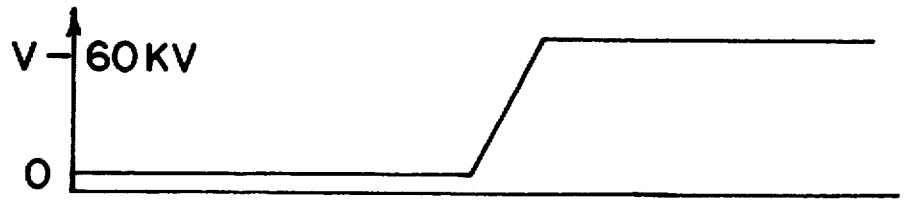

Under these conditions, as shown in FIG. 4, a dry band 6 of typical length 60 mm may form on the cable 1 in the region of the clamp 4 at the tower, due to joule heating of the surface water on the cable. This has the result that almost the entire induced voltage is dropped across this length of cable, and arcing may occur at this point with consequent damage to the cable jacket.

Figure 5:
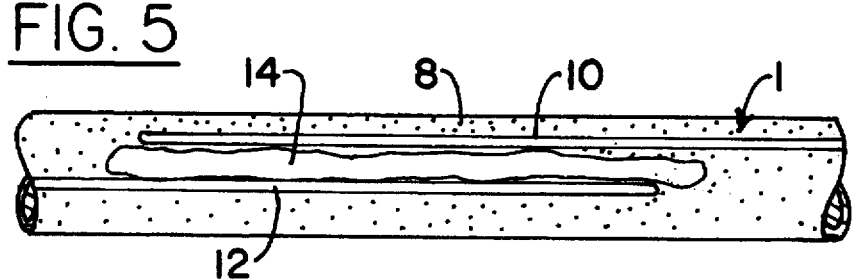
FIG. 5 is a schematic view of a cable according to the invention under wet conditions indicating the principle of the invention.

FIG. 5 shows a section along the length of a cable 1 according to the present invention which includes a cable jacket 8 and a number of electrically conductive elements 10 and 12 on the surface thereof. Wet regions of the cable jacket due to natural precipitation are indicated by stippling. The adjacent conductive elements 10 and 12 extend longitudinally for about 400 mm and overlap adjacent elements by about 180 mm. In this case, if joule heating of surface water due to the induced currents were to lead to the formation of a dry area 14 between the conductive elements 10 and 12, the regions of the cable to the left and right of the dry area 14 could not be electrically isolated, and no dry-band arcing would therefore occur, unless the ends 16 and 18 of the dry patch could join up on the opposite side of the cable to that shown. In view of the relatively large degree of separation between these ends, the occurrence of dry band arcing will be suppressed. The cable 1 is, however, still electrically insulating along its length under dry conditions, and so may be installed by conventional procedures while the power conductors are on load.

Figure 6:
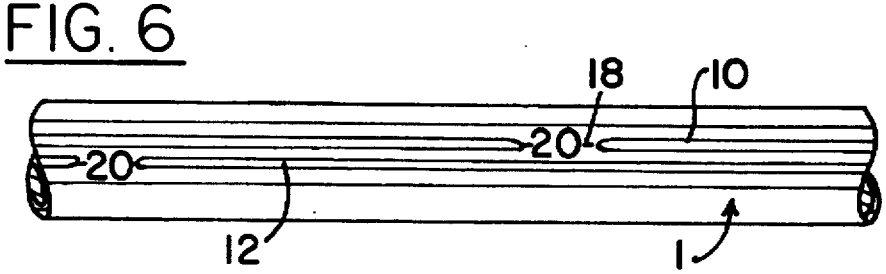
FIG. 6 is a schematic view of one form of cable according to the invention.

FIG. 6 shows part of an optical cable according to the invention in which a number of elongate conductive elements 10, 12 have been applied along its length. These conductive elements have been made by forming a pair of continuous conductive tracks on a layer 18 of insulating material and then removing portions 20 alternately of the different tracks to form an array of separate, overlapping elements. The strip so formed may then be bonded or otherwise secured to a conventional ADSS cable.

Figure 7:
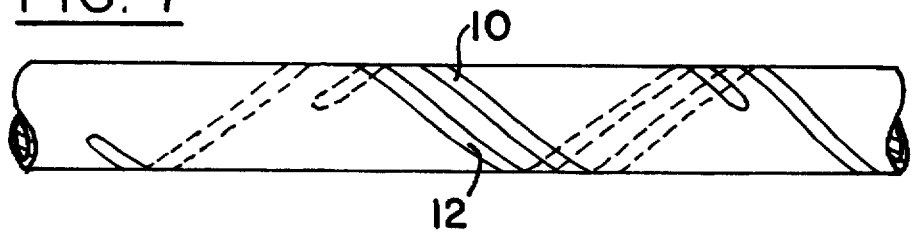
FIG. 7 is a schematic view of another form of cable according to the invention.

FIG. 7 shows schematically another form of optical cable according to the invention in which the conductive elements 10, 12 extend helically around the cable. The conductive elements may be formed by helically wrapping a tape provided with conductive elements as described in FIG. 6, or a woven or braided tape in which some of the strands forming the weave or braid are conductive. If the tape is formed from a woven material it is cut on the bias to form an array of diagonally oriented conductive elements 10, 12, while if it is formed from a braid, the braid is cut longitudinally.

Preferably, and as shown, the area of overlap extends at least one complete revolution around the cable in order to extend the length of any dry band as far as possible before dry-band arcing can occur.

We claim:

1. An optical cable which comprises one or more optical fibres and an electrically insulating jacket, wherein the cable includes an array of elongate conductive elements each of which extends along a portion of the cable, adjacent conductive elements axially overlapping each other with overlapping portions thereof circumferentially spaced apart to form a composite conductive path that extends along the cable and is interrupted when the cable is dry, adjacent conductive elements being resistively coupled to each other when the surface of the cable is wet to form a continuous electrically conductive path along the cable.

2. A cable as claimed in claim 1, wherein the conductive elements form part of a woven material.

3. A cable as claimed in claim 2, wherein the woven material is located helically around the cable.

4. A cable as claimed in claim 2, wherein the woven material is cut on the bias so that the conductive elements, which form part of the warp or the weft, extend helically around the cable.

5. A cable as claimed in claim 1, wherein an overlapping portion between adjacent conductive elements extends at least 50 mm along the cable.

6. A cable as claimed in claim 5, wherein the overlapping portion extends at least 100 mm along the cable.

7. A cable as claimed in claim 1, wherein the elements extend helically around the cable.

8. A cable as claimed in claim 7, wherein an overlapping portion between adjacent conductive elements extends at least one complete revolution around the cable.

9. A cable as claimed in claim 1, wherein the conductive elements are located within or under the jacket and are capacitively coupled to surface water on the cable when the cable is wet, but have substantially no capacitive coupling between each other.

10. A cable as claimed in claim 1, wherein the conductive elements are located on the surface of the jacket.

11. An overhead optical transmission system including an optical cable supported between towers, masts or other supports that also support electrical power cables, said optical cable comprising one or more optical fibers and an electrically insulating jacket, wherein the cable includes an array of elongate conductive elements each of which extends along a portion of the cable, adjacent conductive elements axially overlapping each other with overlapping portions thereof circumferentially spaced apart to form a composite conductive path that extends along the cable and is interrupted when the cable is dry, adjacent conductive elements being resistively coupled to each other when the surface of the cable is wet to form a continuous electrically conductive path along the cable.

12. The system of claim 11, wherein the conductive elements form part of a woven material.

13. The system of claim 12, wherein the woven material is located helically around the cable.

14. The system of claim 12, wherein the woven material is cut on the bias so that the conductive elements, which form part of the warp or the weft, extend helically around the cable.

15. The system of claim 11, wherein the elements extend helically around the cable.

16. The system of claim 15, wherein an overlapping portion between adjacent conductive elements extends at least one complete revolution around the cable.

17. The system of claim 11, wherein an overlapping portion between adjacent conductive elements extends at least 50 mm along the cable.

18. The system of claim 17, wherein the overlapping portion extends at least 100 mm along the cable.

19. The system of claim 11, wherein the conductive elements are located within or under the jacket and are capacitively coupled to surface water on the cable when the cable is wet, but have substantially no capacitive coupling between each other.

20. The system of claim 11, wherein the conductive elements are located on the surface of the jacket.

* * * * *